United States Patent [19]

Grabis

[11] Patent Number: 5,366,056
[45] Date of Patent: Nov. 22, 1994

[54] CLUTCH FRICTION WHEEL, ESPECIALLY FOR A MOTOR VEHICLE CLUTCH

[75] Inventor: Thomas Grabis, Kirchardt, Germany

[73] Assignee: Valeo, Paris, France

[21] Appl. No.: 57,760

[22] Filed: May 5, 1993

[30] Foreign Application Priority Data

May 7, 1992 [FR] France .................. 92 05640

[51] Int. Cl.⁵ .................. F16D 3/12; F16D 3/76; F16D 3/77
[52] U.S. Cl. .................. 192/106.1; 192/DIG. 1; 464/83; 464/84
[58] Field of Search ............... 192/106.1, 70.17, 70.13, 192/DIG. 1, 30 V; 464/83, 84, 85, 100

[56] References Cited

U.S. PATENT DOCUMENTS

| | | | |
|---|---|---|---|
| 1,689,861 | 10/1928 | Clark | 464/83 |
| 1,716,496 | 6/1929 | Macauley, Jr. | |
| 1,997,021 | 4/1935 | Spase | 192/106.1 X |
| 2,550,101 | 4/1951 | Wallerstein | 464/83 |
| 3,216,267 | 11/1965 | Dolza | 464/83 X |
| 3,428,155 | 2/1969 | Binder et al. | 192/106.1 |
| 5,135,093 | 8/1992 | Sabolish | 192/70.13 X |

FOREIGN PATENT DOCUMENTS

| | | | |
|---|---|---|---|
| 232682 | 5/1959 | Australia | 192/106.1 |
| 0382197 | 8/1990 | European Pat. Off. . | |
| 855926 | 5/1940 | France | 464/85 |
| 2517006 | 5/1983 | France | 192/106.1 |
| 2733880 | 2/1978 | Germany | 192/106.1 |
| 3248120 | 6/1984 | Germany . | |
| 3832925 | 5/1989 | Germany . | |
| 288526 | 5/1953 | Switzerland | 464/85 |
| 714644 | 9/1954 | United Kingdom | 192/106.1 |
| 2152190 | 7/1985 | United Kingdom . | |

Primary Examiner—Rodney H. Bonck
Attorney, Agent, or Firm—Longacre & White

[57] ABSTRACT

A clutch friction wheel, especially for a motor vehicle clutch, comprises two coaxial parts which are mounted for rotation of one with respect to the other about a common axis, with an annular damper between them. The damper comprises two rings one of which is in contact with a surface of the first coaxial part, while the other is in contact with a surface of the other part. The two rings of the damper are joined together by elastic members. The rings of the damper are disposed in a groove formed in one of the two coaxial parts, and they are divided into at least two ring segments, each of which includes an equivalent element of each of the two rings.

9 Claims, 1 Drawing Sheet

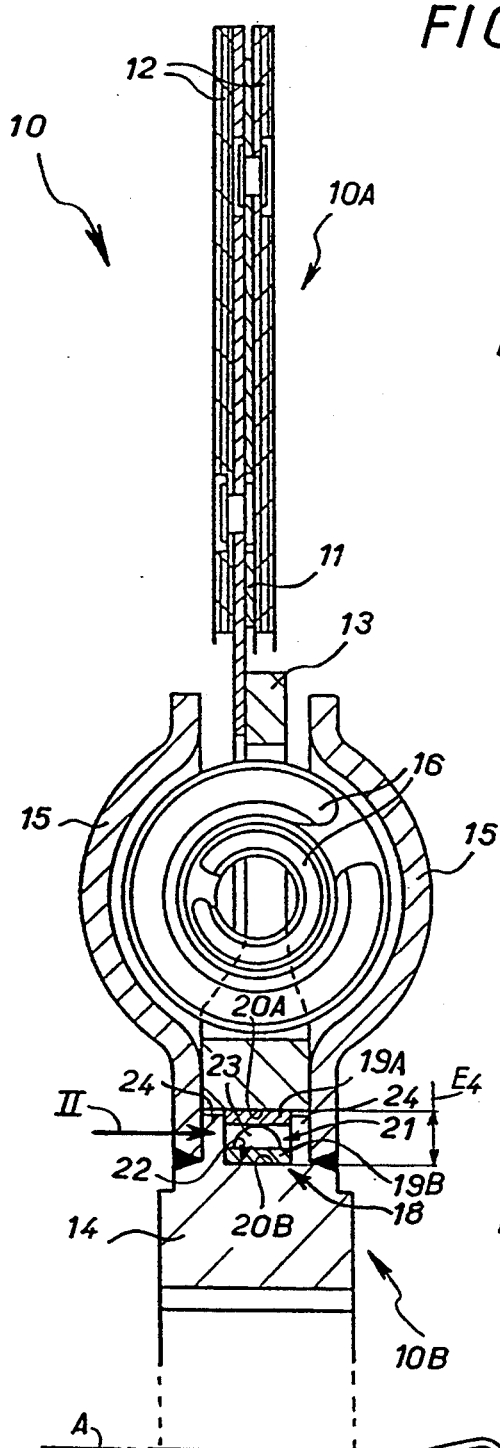
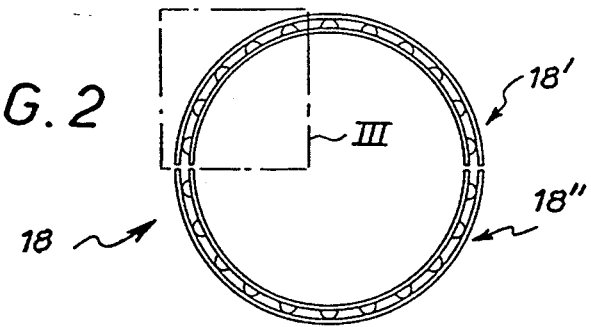
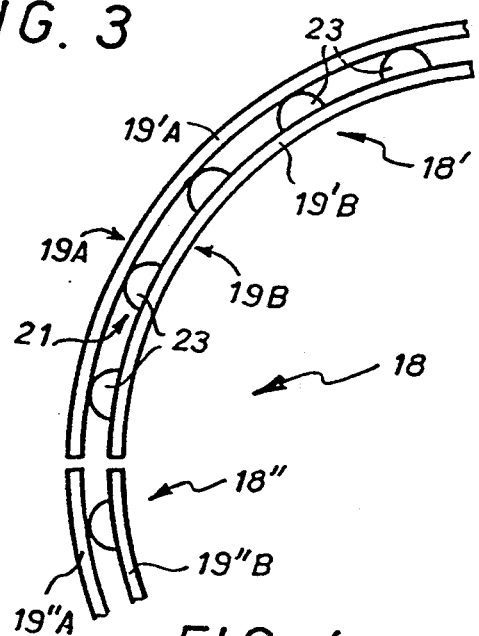
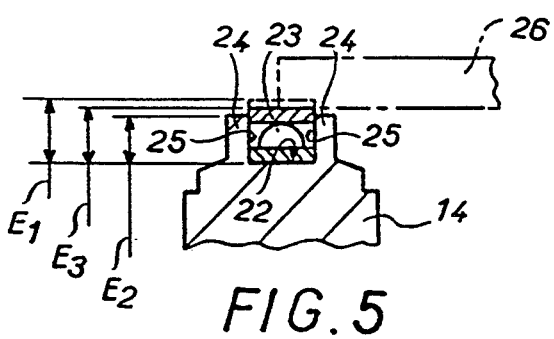
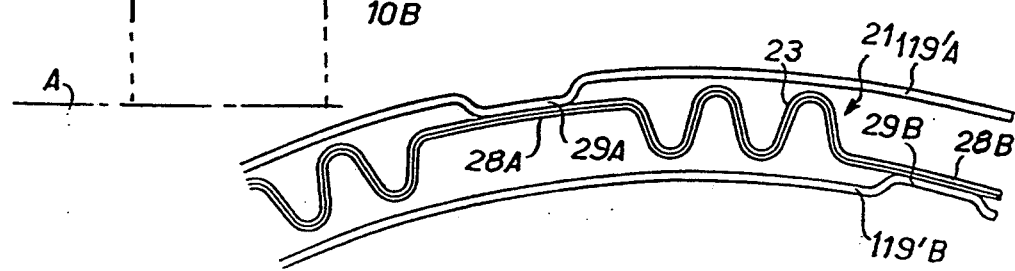

CLUTCH FRICTION WHEEL, ESPECIALLY FOR A MOTOR VEHICLE CLUTCH

FIELD OF THE INVENTION

This invention relates to clutch friction wheels, especially for motor vehicle clutches, of the kind comprising at least two coaxial parts which are mounted for rotation with respect to each other about a common axis, with damping means acting between these two parts.

More particularly, the invention is concerned with the case in which, as described for example in the specification of U.S. Pat. No. 3,428,155, the damping means consist of a compound ring, coaxial with the two coaxial parts and comprising two coaxial rings, one of which is in contact with a surface of one of the said parts, while the other is in contact with a surface of the other one of the said parts, the said rings being joined together by resilient means.

BACKGROUND OF THE INVENTION

In the above mentioned U.S. patent, the damping means are in the form of a continuous circular ring, and there are thus two rings, each of which is disposed on a respective side of an annular rib of that one of the two coaxial rotatable parts which lies radially inward of the other. This results in some complexity in assembly, since components have to be fitted over other components in opposite axial directions.

An object of the present invention is to provide a clutch friction wheel of the kind defined under "Field of the Invention" above in which this difficulty is overcome.

According to the invention, a clutch friction wheel, especially for a motor vehicle, of the kind comprising at least two parts mounted for rotation with respect to each other about an axis, with damping means acting between the said parts, the said damping means comprising, coaxially about the said axis, two rings, one of which is in contact with a surface of one of the said parts, while the other is in contact with a surface of the other one of the said parts, the said rings being joined together by resilient means, is characterised in that the said damping means are disposed in a groove of one of the said parts, the said damping means being divided into at least two ring segments, each of which includes an equivalent element of each of the said rings.

Fitting of the damping means in a clutch friction wheel according to the invention thus involves only a simple radial engagement of ring segments in a groove.

In addition, when one of the two coaxial parts of the clutch wheel comprises a clutch plate, with the other part including two guide rings, the clutch plate can have the advantage of being thickened axially, at least at its inner periphery, or it can be made of increasing thickness in the radially inward direction if necessary, and this makes it more robust, like the guide rings.

Thus the whole clutch friction wheel assembly is extremely robust.

The various features and advantages of the invention will appear more clearly on a reading of the description of preferred embodiments of the invention which follows, and which is given by way of example only and with reference to the accompanying diagrammatic drawings.

BRIEF DESCRIPTION OF THE DRAWINGS

FIG. 1 is a view in axial cross section showing part of a clutch friction wheel in accordance with the invention.

FIG. 2, which is on a smaller scale than FIG. 1, is an elevation showing damping means which form part of the same clutch friction wheel.

FIG. 3 repeats on a larger scale the detail indicated at III in FIG. 2.

FIG. 4 is a scrap view in axial cross section derived from FIG. 1 showing the fitting of the damping means in accordance with the invention.

FIG. 5 is another scrap view, seen in elevation and showing a modified embodiment as compared with FIG. 3.

DESCRIPTION OF PREFERRED EMBODIMENTS OF THE INVENTION

FIG. 1 shows part of a clutch friction wheel 10 defining an axis of rotation A. It comprises at least two parts 10A, 10B, which are coaxial with each other on the common axis A, and which are mounted for rotation with respect to each other about this axis. In the present example, there are only two of these coaxial parts, 10A and 10B.

The part 10A comprises a clutch disc 11, carrying friction liners 12 on either side towards its outer periphery. At its inner periphery the disc 11 is fixed to a clutch plate or face plate 13, for example by riveting or welding. The part 10B comprises a hub 14 and two guide rings 15 which are fixed to the hub and which flank the clutch plate 13. In this example the guide rings 15 are secured to the hub 14 by welding between the inner periphery of the guide rings 15 and the outer periphery of the hub 14. It will however be noted that the guide rings may alternatively be secured by upsetting of material, which may be effected between the inner perimeter of the guide rings and the outer periphery of the hub 14.

The coaxial parts 10A and 10B are mounted for rotation of one with respect to the other against the action of primary resilient means, which in this example comprise springs 16 interposed circumferentially between the two parts 10A and 10B. This rotational movement is limited to an angular displacement which is controlled, for example, by pins or bars (not shown here), which connect the two guide rings 15 together and pass loosely through the clutch plate 13. In a modification, the angular displacement may be limited by mutual engagement of the turns of the springs 16. In the present example the springs 16 are mounted in pairs in windows formed in the clutch plate 13 and corresponding apertures formed by pressing in the guide rings 15.

The arrangements as described thus far are well known and need not be described in any greater detail here.

Also in known manner, a damping means (a damper) 18 is also interposed between the two coaxial parts 10A and 10B of the clutch wheel. The damper 18 is in general terms annular, being coaxial on the axis A, and it includes a pair of rings 19A and 19B coaxial with each other. The outer ring 19A is in contact with an annular surface 20A of the coaxial part 10A, while the inner ring 19B is in contact with another annular surface 20B of the coaxial part 10B. The two surfaces 20A and 20B are both cylindrical in the present example. The two rings 19A and 19B are connected to each other by radially acting resilient means 21 interposed radially between them, to form a compound ring.

The damping means 18 are disposed in a groove 22 which, in general terms, is formed in one of the two coaxial parts 10A or 10B of the clutch wheel. The appropriate surface 20A or 20B forms the base of this groove. In order to enable the damping means to be fitted in the groove 22, the former is divided into at least two ring segments 18', 18". The segment 18' comprises portions 19'A and 19'B of the rings 19A and 19B respectively, while the segment 18" comprises portions 19'A and 19"B of the rings 19A and 19B respectively.

In the example shown, the damping means 18 are divided into only two ring segments 18' and 18", each extending over about 180 degrees so that each of these ring segments constitutes a half ring. Also in the example shown, the groove 22 is formed in the coaxial part 10B which lies radially inward of the other part 10A. The base of the groove 22 is therefore the surface 20B, the other surface 20A being the internal bore of the clutch plate 13. The outer periphery of the hub 14 is formed on a central radial flange lying between the two guide rings 15, and the groove 22 is formed in this flange so that it is bounded by two upstanding flange portions 24 against which the guide rings 15 are abutted.

The clutch plate 13 is thickened axially at its inner periphery, where it extends between the two guide rings 15, its axial thickness here being greater than the width of the groove 22 so that it overlies both of the flange portions 24.

The radially acting resilient means 21 of the damper 18, mentioned above, comprise at least one resilient, or elastic, member 23 in each ring segment 18' or 18", arranged between the ring elements 19'A and 19'B, or 19"A and 19"B of that ring segment. As shown in FIG. 3, there are in this example several of these resilient members 23 arranged along each of the ring segments 18' or 18". In FIGS. 1 to 4, each of these resilient members 23 consists of a pad of elastic material which is interposed radially between the associated ring elements 19'A and 19'B, or 19"A and 19"B, to which they are secured, for example by adhesive bonding. The elastic pads 23 are of generally semicircular cross section, with their poles applied to the outer ring segment 19'A or 19"A, and their meridian faces abutted against the inner ring element 19'B or 19"B.

The two compound ring segments 18', 18" constituting the damping means 18 are fitted in the groove 22 of the hub 14 before the guide rings 15 are welded in place on the latter. The ring segments are fitted by simple radial engagement in positions which are diametrically opposed to each other and on either side of the axis A. In their relaxed position, and as indicated in broken lines in FIG. 4, the damping means 18 have a radial thickness E1 which is greater than the radial depth E2 of the flanks 25 of the groove 22, such that in service they are under radial compression between the two coaxial parts 10A and 10B. For fitting of the coaxial part 10A on the damper 18 by simple axial engagement, before the guide rings 15 are fitted, a tool indicated in phantom lines in FIG. 5 at 26 is used to reduce the thickness of the damper 18 to a depth E3, which is smaller than its initial thickness E1. Once the part 10A has been positioned, the thickness E4 (FIG. 1) of the damper 18 is substantially equal to this value E3.

Referring now to FIG. 5 showing a modified embodiment, each of the resilient members 23 comprises a leaf spring, which in this example is of a multilayer kind. FIG. 5 shows only part of one of the ring segments, the ring elements of this segment being indicated at 119'A and 119'B. The construction of the other ring segment or segments is the same and need not be described separately. As shown in FIG. 5, the multilayer leaf spring 23 is fixed to both of the ring elements 119'A and 119'B, by means of respective fastening portions 29A and 29B respectively in the form of radial depressions formed in the ring elements, with attachment portions 28A and 28B respectively of the spring being engaged against these depressions. The attachment portions 28A and 28B are spaced apart from each other circumferentially along the spring 23, the latter being formed with a corrugated, or wave, shape between one attachment portion and the next. Each leaf spring 23 is secured to the associated ring elements, for example by welding.

It will be noted that the guide rings 15 are not formed with any holes for accommodating actuating lugs, or the like, of any thrust rings: they are therefore extremely robust. The same is true of the clutch plate 13, having regard to the thickening or axial widening of the latter at its inner periphery.

In a further modification not shown, the clutch plate 13 may in addition be widened along its whole radial height in such a way that it is widest at its inner periphery: the windows formed in the clutch plate to accommodate the springs 16 may be made by laser cutting.

The present invention is not limited to the embodiments described above and shown in the drawings, but embraces all practical variants and/or combinations of the various elements. It should also be noted that its field of application is not limited to clutch wheels consisting of two coaxial parts displaceable circumferentially with respect to each other, but is also applicable to clutch friction wheels having three such parts.

What is claimed is:

1. A clutch friction wheel comprising a first rotatable part, a second rotatable part having a common axis with said first part, means mounting the two said parts for relative rotation of one with respect to the other, one of said parts having a first annular surface, the other having a second annular surface, a damping means consisting of an annular assembly comprising two coaxial rings in contact with said first and second annular surfaces respectively, and resilient means joining said rings together, wherein one of said rotatable parts defines a groove, the damping means being disposed in said groove and being divided into at least two ring segments, each segment comprises equivalent portions of each of said rings, and wherein said groove defines a pair of opposed flanks defining a radial depth thereof, the damping means having in the relaxed state a radial thickness greater than said radial depth of the flanks, whereby to be under compression between the two said rotatable parts in service.

2. A clutch friction wheel according to claim 1, wherein, in each said ring segment, said resilient means comprise at least one elastic member between the portions of each of said rings for that segment.

3. A clutch friction wheel according to claim 2, wherein each said elastic member comprises a pad of elastic material interposed radially between, and secured to, the portions of each of said rings for that segment.

4. A clutch friction wheel according to claim 2, wherein each said elastic member is a leaf spring extending along the corresponding segment, and having attachment portions spaced apart along the spring circumferentially of the latter and secured to alternate ones of the portions of each of said rings for that segment.

5. A clutch friction wheel according to claim 4, wherein each leaf spring defines a wave shape between each said attachment portion and the next.

6. A clutch friction wheel according to claim 4, wherein each ring element is formed with a depression extending towards the other ring element of the same ring segment, with each attachment portion of the leaf spring being attached to a corresponding said depression.

7. A clutch friction wheel according to claim 2, having a plurality of said elastic members spaced apart circumferentially along each ring segment and between the ring elements of that segment.

8. A clutch friction wheel according to claim 1, wherein the damping means comprise two said ring segments, each constituting a half ring.

9. A clutch friction wheel according to claim 1, wherein said groove is formed in the second said rotatable part which comprises a hub and two guide rings fixed to the hub and wherein an outer periphery of the hub is formed on a central flange lying between the two guide rings and the groove is formed in said flange so that it is bounded by two upstanding flange portions against which the guide rings are abutted.

* * * * *